United States Patent  
Osten

(10) Patent No.: US 7,395,136 B2
(45) Date of Patent: Jul. 1, 2008

(54) ROBOT END EFFECTOR DETACHMENT SENSOR

(75) Inventor: Gabriel F. Osten, St. Croix Falls, WI (US)

(73) Assignee: SIG Doboy Inc., New Richmond, WI (US)

( * ) Notice: Subject to any disclaimer, the term of this patent is extended or adjusted under 35 U.S.C. 154(b) by 743 days.

(21) Appl. No.: 10/776,498

(22) Filed: Feb. 10, 2004

(65) Prior Publication Data

US 2005/0177279 A1  Aug. 11, 2005

(51) Int. Cl.
*G05B 19/00* (2006.01)
(52) U.S. Cl. ............... 700/258; 700/245; 700/255; 700/250; 74/490.01; 901/2; 901/27; 901/30
(58) Field of Classification Search ............... 700/258, 700/245, 255, 250; 74/490.01, 490.04; 901/2, 901/27; 73/649, 652, 862.381
See application file for complete search history.

(56) References Cited

U.S. PATENT DOCUMENTS

| | | | | |
|---|---|---|---|---|
| 4,976,582 A | * | 12/1990 | Clavel | ............... 414/729 |
| 5,645,077 A | * | 7/1997 | Foxlin | ............... 600/587 |
| 5,807,408 A | | 9/1998 | Ruiz | |
| 5,903,123 A | | 5/1999 | Shimogama | |
| 6,382,012 B2 | | 5/2002 | Hara et al. | |
| 6,429,617 B1 | | 8/2002 | Sano et al. | |
| 6,433,681 B1 | * | 8/2002 | Foo et al. | ............... 340/440 |
| 6,516,681 B1 | | 2/2003 | Pierrot et al. | |
| 6,543,987 B2 | | 4/2003 | Ehrat | |
| 6,662,673 B1 | | 12/2003 | Olgado | |

FOREIGN PATENT DOCUMENTS

EP  0 250 470  7/1991

OTHER PUBLICATIONS

Sprenger B., Binzel O. and Siegwart R.: "Control of a High Performance 3 DoF Linear Direct Drive Operating with Submicron Precision", The Fourth Int. Conference on Motion and Vibration Control (Movic), Z ürich, Switzerland, Aug. 1998, pp. 1145-1150.*
Systron Donner Inertial, a company of Schneider Electric. GyroChip® Data Sheet. Nov. 21, 2003 . Internet Archive. <http://web.archive.org/web/*/http://www.systron.com/pro_QRS14.asp>.*
Application Note AN00022, Electronic Compass Design using KMZ51 and KMZ52, *Phillips Semiconductors*, Mar. 30, 2000, pp. 1-38.

* cited by examiner

*Primary Examiner*—Thomas Black
*Assistant Examiner*—Marie A Weiskopf
(74) *Attorney, Agent, or Firm*—Thomas J. Nikolai; Nikolai & Mersereau, P.A.

(57) ABSTRACT

A robot device includes a sensor on its base plate capable of sensing rotation of the base plate occasioned by decoupling of a detachable joint that joins a forearm member of the robot to the base plate. The sensor produces an output signal which, if above a preset threshold, shuts off the motors driving the robot.

8 Claims, 3 Drawing Sheets

ROBOT END EFFECTOR DETACHMENT SENSOR

BACKGROUND OF THE INVENTION

I. Field of the Invention

This invention relates generally to high speed pick-and-place robotic machines, and more particularly to a fail-safe control circuit that is operative to disable the robot in the event of a machine fault condition.

II. Discussion of the Prior Art

In U.S. Pat. No. 4,976,582 to Raymond Clavel (the Clavel '582 patent), there is described a robot for handling products in a three-dimensional space. The teachings of that patent are hereby incorporated by reference as if fully set forth herein. Because of the three-sided geometry of the mechanism, the device in the Clavel '582 patent has become known in the industry as a Delta Robot and that terminology will be used herein. The robot of the type described therein is designed for high-speed and high-accuracy pick-and-place applications, such as may be effectively used in the packaging machine industry, for picking products from a conveyor belt and placing them in cartons or to the infeed of a high-speed wrapping machine with a predetermined orientation and spacing between products.

Referring to FIG. 2 of the Clavel '582 patent, the Delta Robot includes a generally triangular-shaped main casting 1 having three rotatable shafts 2 journaled for rotation about horizontal axes extending generally parallel to the three sides of the triangular casting 1. Each of the three shafts is arranged to driven by a servo motor 3 for rotating the arms 4 in a vertical plane. Rotary encoders 7 on the servo motor 3 feed positional information to a main controller module 12.

At the free ends of the arms 4 are crossbars of a predetermined length dimension and carrying a detachable connector, such as ball and socket joints 26, at opposed ends thereof. The detachable ball and socket joints 26 couple the crossbars to pairs of rods or six forearms 5, all of equal length. Suspended from the lower ends of the six forearms 5 is a triangular shaped base plate member 8. More particularly, cross rods project laterally from the base plate 8 proximate the three vertices thereof and detachable connectors, e.g., ball and socket joints 27, are used to join the lower ends of the forearm members 5 to the cross rods.

Supported from the underside of the base plate 8 is an end effector 9 which may comprise a vacuum cup or other type of gripping member. In that the forearms 5 are of equal length, as the respective servo motors impart rotation to the arms 4, the base plate 8 carrying the end effector 9 undergoes pure translation without rotation in first swinging to pick up a product located in a first area and transporting it to a second area for release. Occasionally, inertial forces or impact forces occurring when the end effector hits a product can result in disengagement of one or more of the ball-joint connections 27 between the forearms 50 and the base plate 8. When this occurs, the base plate and end effector move in an uncontrolled manner, which can cause damage to the end effector itself or to products being handled. It is, therefore, desirable to provide a protection or safety feature to the robot to prevent damage to the machine or the products being handled in those instances where one or more of the ball or socket joints 27 become detached. The present invention provides such protection.

SUMMARY OF THE INVENTION

In accordance with the present invention there is provided a safety device for a motor-driven industrial robot of a type including a plurality of arms that are pivotally and/or rotationally joined and whose movement is controlled by one or more servo motors so as to cause an end effector to move in a three-dimensional space. The safety device includes a power interrupter circuit that is operative to deactivate the motor(s) controlling the movement of the robot arms upon receipt of an electrical control signal. The electrical control signal is provided by a sensing element that is coupled to the end effector when the end effector is either rotated or translated in other than a horizontal plane. A communication link is provided for coupling the electrical control signal to the power interrupter circuit for controlling an operational state of the industrial robot. The power interrupter circuit may include a comparator that outputs the electrical control signal only when the output from the sensing element exceeds a predetermined threshold value.

DESCRIPTION OF THE DRAWINGS

The foregoing features, objects and advantages of the invention will become apparent to those skilled in the art from the following detailed description of the preferred embodiment of the invention, especially when described in conjunction with the accompanying drawings in which like numerals in the several views refer to corresponding parts.

DESCRIPTION OF THE PREFERRED EMBODIMENT

Figure 1:
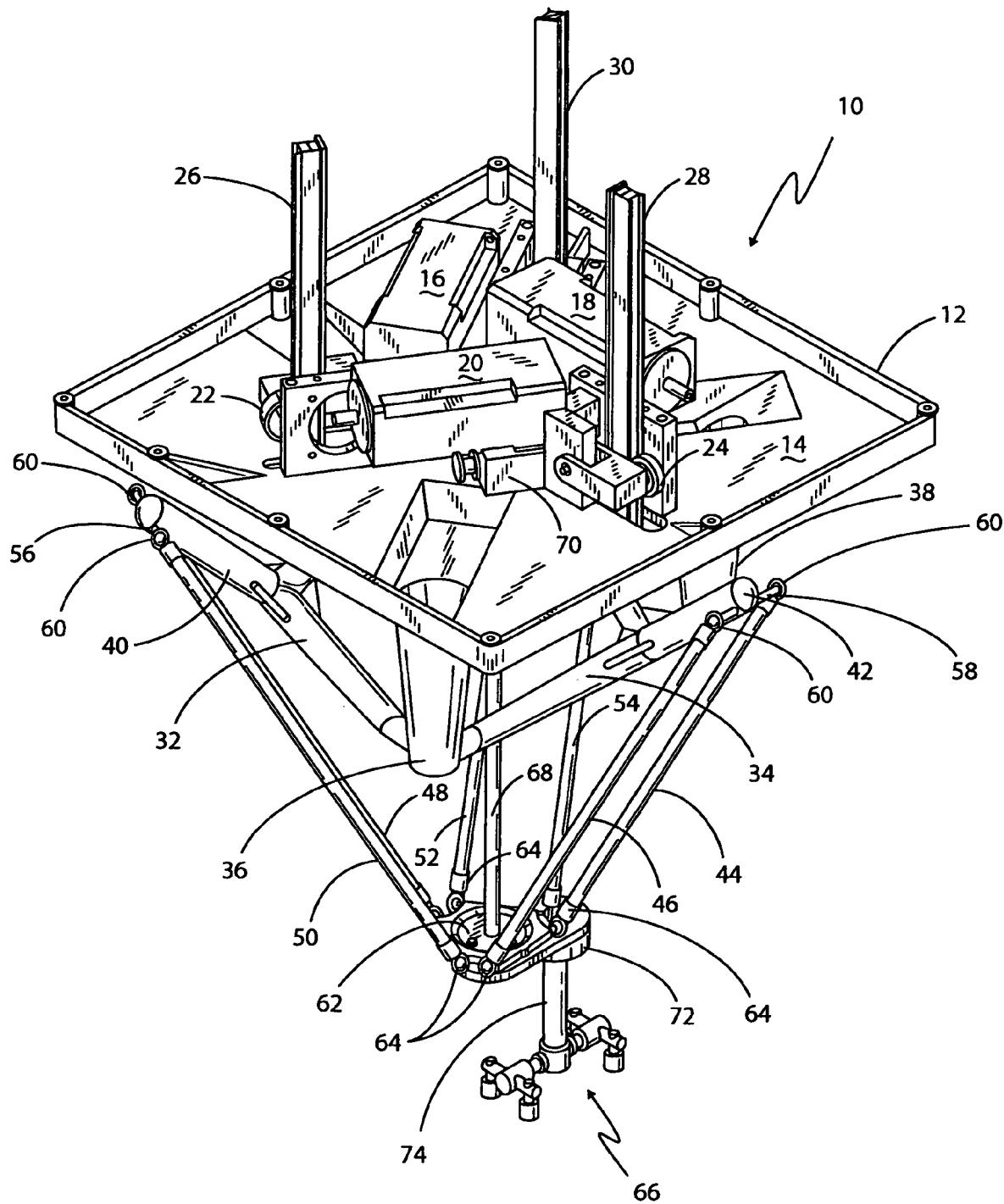
FIG. 1 illustrates a prior art Delta Robot with which the present invention finds use.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Referring to FIG. 1, there is indicated generally by numeral 10 a Delta Robot in which the present invention can be used. It is to be understood, however, that the safety device of the present invention can be applied to a wide range of industrial robots. The exemplary Delta Robot is seen to include a main casting 12, which is typically mounted in a cabinet housing (not shown). Supported on the upper side surface 14 thereof are three servo motors 16, 18 and 20. The servo motors are arranged to drive pinion gears, two of which are visible in FIG. 1 and are identified by reference numerals 22 and 24. The pinion gears, driven by the servo motors, cooperate with three gear racks 26, 28 and 30. The lower ends of the gear racks 26, 28 and 30 connect to three Y-shaped arm members, only two of which are visible in the view of FIG. 1. They are identified by numerals 32 and 34.

Depending downward from the undersurface of the main casting 12 are three pedestals, which are located at the vertices of an imaginary equilateral triangle. Only pedestals 36 and 38 are visible in the view of FIG. 1. The three Y-shaped arms as at 32 and 34 have opposed ends thereof journaled for rotation between adjacent pedestals. The three gear racks 26, 28 and 30 extend through apertures formed in the surface 14 of the main casting 12 and pivotally connect to respective ones of the stem portions 40 and 42 of the three Y-shaped arm members of which only arm members 32 and 34 are shown. Thus, when the pinion gears, as at 22 and 24, are driven by their respective servo motors 20 and 18, the racks move up and down, thereby pivoting the arms to which they attach so that the stem portions 40 and 42 of the arms 32 and 34 rotate in vertical planes. The third arm (not shown) operates in an identical manner when actuated by the gear rack 30.

Coupled to the stems of the three arms, as at 40 and 42, are a pair of forearm members as at 44 and 46 that connect to the stem 42, and forearms 48 and 50 that connects to arm stem 40. Forearm members 52 and 54 connect to the stem of the third arm member that is hidden from view in FIG. 1. Short, horizontally-extending pins, as at 56 and 58, extend transversely through the stems 40 and 42 of the arm members 32 and 34 that are seen in FIG. 1. Likewise, the stem of the arm that is hidden from view in FIG. 1 also has a transversely extending pin. Detachable connectors comprising ball and socket joints, as at 60, couple the upper ends of the forearm members to the pins.

Still with reference to FIG. 1, disposed at the lower ends of the six forearm members is a triangular-shaped base plate 62. More particularly, detachable connectors that again may comprise ball and socket joints located proximate the vertices of the triangular base plate 62 are used to couple the base plate to the lower ends of the three pairs of forearm members. The detachable ball and socket joints at the lower ends of the forearm members are identified by reference numeral 64. The pins 56, 58, etc. are equal in length to the sides of the triangular base plate 62 such that the individual pairs of forearm members have their components in parallel, spaced-apart relationship.

Projecting downwardly from the underside of the base plate 62 is an end effector assembly 66. A shaft 68 is journaled for rotation between the main casting 12 and the center of the triangular base plate 62. This shaft is adapted to be driven by a servo motor 70 mounted on the main casting through a suitable gear drive. The shaft 68 has a pulley (not shown) disposed beneath the base plate 62 and it is coupled by an endless belt to a pulley 72 affixed to the shaft 74 of the end effector assembly 66. Thus, under control of a microprocessor-based controller, the end effector assembly 66 can be rotated to provide a desired orientation to a product being picked-and-placed.

Figure 2:
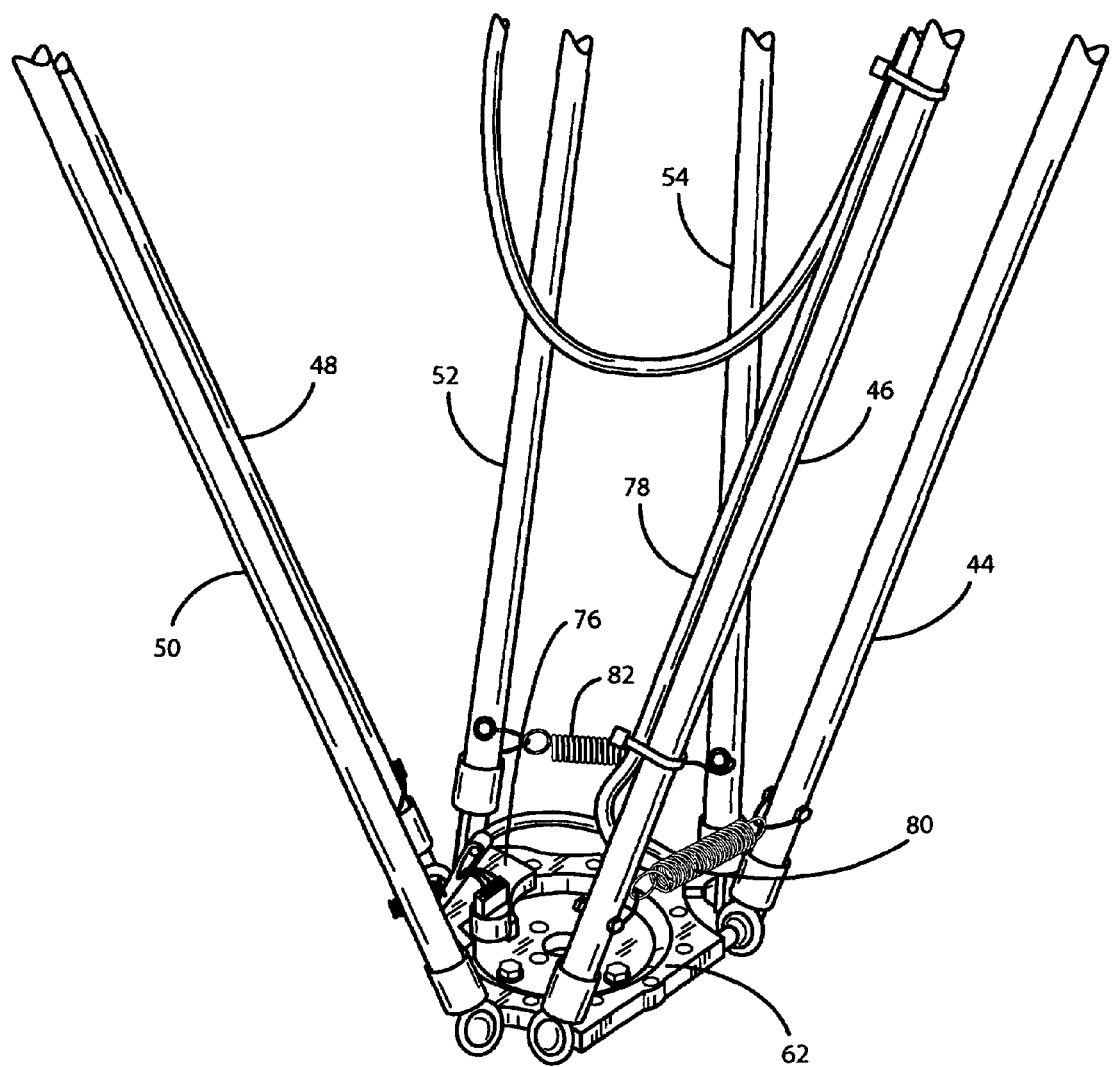
FIG. 2 is a detailed drawing of the base plate portion of a robotic device with the sensor of the present invention disposed thereon.

FIG. 2 is an enlarged view of the base plate 62 and its connection to the lower ends of the forearm members 44 and 46, 48 and 50 and 52 and 54. Affixed to the surface of the base plate 62 is a sensor module 76, capable of detecting at least one of inclination of the base plate 62 from a horizontal disposition or rotational motion of the base plate member 62 about a fixed axis. An electrical cable 78 is shown as connecting to the sensor module 76 and to the main controller module, similar to the control module 12 of the Clavel '582 patent. Those skilled in the art will appreciate that a wireless communication link may be substituted for cable 78.

Also shown in the view of FIG. 2 are tension springs as at 80 and 82 that extend between associated forearm members of the three sets thereof proximate their lower ends. These springs tend to urge the sockets affixed to the lower ends of the forearm members into engagement with the associated balls that mount to the base plate 62. These springs are designed to yield in the event the base plate and its associated end effector strike an object with a predetermined force that will cause one or more of the detachable ball-and-socket joints 64 to disengage from one another.

In normal operation of the described robot, the servo motors 16, 18 and 20 drive the gear racks 26, 28 and 30 to thereby impart a swinging motion, translating the base plate 62 while still maintaining it in a horizontal disposition throughout its range of motion. However, should one or more of the detachable ball joints coupling the base member to the forearms become disengaged, the base plate 62 will either tilt away from the horizontal or begin to rotate. The sensor 76 detects the tilting or rotational movement of the base plate and develops a signal that is sent to an emergency stop (power interrupt) circuit that shuts off power to the servo drives to thereby prevent damage to the robot assembly itself or to products being handled.

Without limitation, the sensor 76 may comprise a solid-state angular rate sensor or gyroscope, such as an ADXRS 150 angular rate sensor available from Analog Devices Corporation. It is commercially-available surface-micromachined angular rate sensor incorporating integrated electronics. Depending on how the device is mounted, its primary axis of sensitivity can be any one of the three axes of motion: yaw, pitch or roll. The device outputs a voltage proportional to the angular rate, as determined by its sensitivity, measured in millivolts per degree per second.

The gyro employed should have the ability to reliably provide an accurate angular rate-output signal even in the presence of environmental shock and vibration. While the ADXRS 150 has been used in implementing the preferred embodiment of the present invention, those skilled in the art will appreciate that various other devices and approaches including electronic, pneumatic and purely mechanical sensors may also be used to detect rotation or inclination of the base plate without departing from the spirit of the invention.

Figure 3:
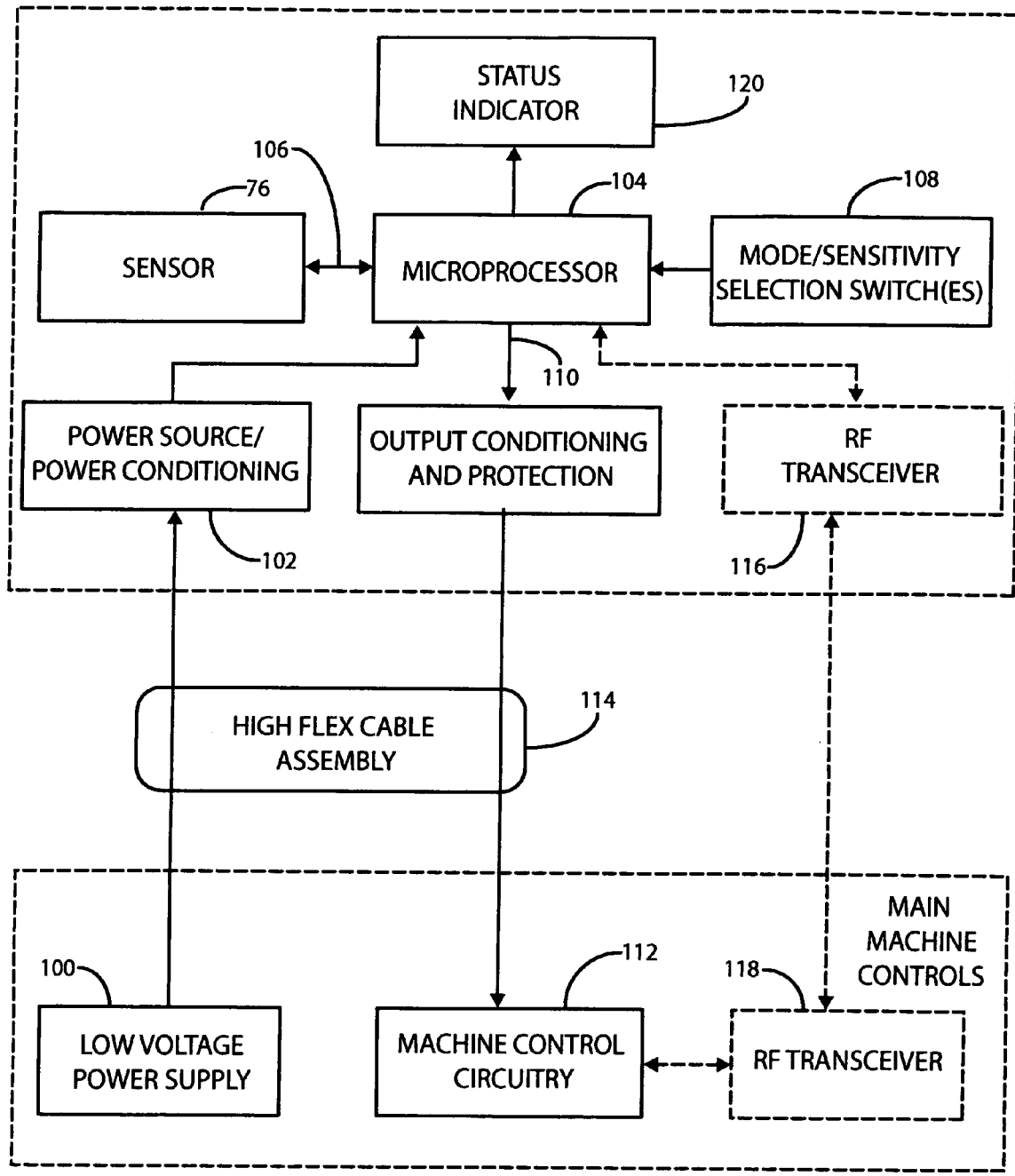
FIG. 3 is a block diagram of the sensor and control circuit used in implementing the present invention.

Turning next to FIG. 3, there is shown a schematic electrical diagram of the sensor and the power interrupt circuit used therewith to turn off the power to the robot 10 in the event that one or more of the ball joints connecting the forearms to the base plate become disengaged. The sensor module 76 may comprise an ADXRS 150. The sensor 76 may be battery powered or may be powered by known low voltage power supply 100 equivalents capable of providing a predetermined DC voltage to a power conditioning circuit 102 which mainly provides reverse polarity protection so that inadvertent hook-up does not damage the microprocessor 104. Those desiring additional information concerning sensor 76 may secure detailed information from data sheets available through Analog Devices Corporation of Norwood, Mass.

The output from the sensor 76 appears on line 106 and is proportional to the angular rate of rotation or tilt about a single axis. The signal on line 106 is fed to the microprocessor 104 that is programmed to compare the amplitude of that signal to a predetermined reference established by an external switch 108 and when the established threshold is exceeded, the microprocessor 104 produces an output signal on line 110 that is delivered to a machine control circuit 112 having a power switch or relay associated with the emergency stop that controls delivery of power to the servo motors of the robot. The use of the mode/sensitivity selection switch 108 to establish a comparator threshold implemented in microprocessor 104 precludes noise picked up by the sensor from causing a shutdown, absent a disengagement of one of the ball-socket joints 60.

As reflected in FIG. 3, instead of applying power to and obtaining an output signal from the microprocessor 104, via a high flexibility cable assembly 114, an optional wireless communications link comprising of transceivers 116 and 118 can be employed. The status indicator 120 merely comprises red and green LED indicator lights for indicating whether the microprocessor is sending out a normal run condition or a stop condition.

Those skilled in the art will appreciate that by providing the sensor and associated control signal, an event associated with detachment of one or more of the forearm members from the base plate carrying the end effector will result in the production of an electrical control signal, the net effect of which is to shut off the machine to prevent its becoming damaged.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. In a robot for picking up and placing products in a three-dimensional space, said robot comprising a main casting from which a plurality of arms are pivotally joined for rotation about a corresponding plurality of axes, the main casting supporting a servo motor connected individually in driving relation to each of the plurality of arms, a base plate suspended from at least one of the plurality of arms where the at least one arm member includes a detachable joint on an opposed end thereof for joining to the base plate at one of the opposed ends, said plurality of arms acting in concert to constrain the base plate to pure translational motion, the improvement comprising:
   (a) angular rate sensing means affixed to the base plate for sensing at least one of inclination and rotation of the base plate upon detachment of said detachable joint from the base plate and producing an electrical control signal; and
   (b) a control circuit coupled to the servo motors and responsive to said electrical control signal for de-energizing the servo motors.

2. The robot as in claim 1 wherein the sensing means comprises a solid state angular rate sensor.

3. The robot as in claim 2 wherein the angular rate sensor produces an electrical control signal proportional to the rate of rotation of the base plate about a predetermined axis.

4. The robot as in claim 3 wherein the control circuit includes a circuit for comparing the electrical control signal to a predetermined threshold value and a switching circuit for inhibiting current delivery to said servo motors when the electrical control signal exceeds said threshold.

5. The robot as in claim 1 and further including an end effector suspended from the base plate.

6. The robot as in claim 4 where said electrical control signal is transmitted via a cable to the control circuit.

7. The robot as in claim 4 where said electrical control signal is transmitted wirelessly to the control circuit.

8. The robot as in claim 1 where the sensing means is battery powered.

* * * * *